March 29, 1932. M. EHLINGER 1,851,759
MEANS FOR REMOVING SCALE DEPOSITS IN STEAM
BOILERS, FEED WATER HEATERS, AND THE LIKE
Filed Dec. 21, 1929
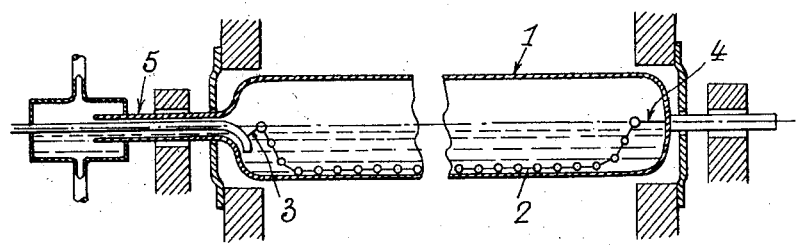
Marcel Ehlinger
INVENTOR
By
his Attorney.

Patented Mar. 29, 1932

1,851,759

UNITED STATES PATENT OFFICE

MARCEL EHLINGER, OF MULHOUSE, FRANCE, ASSIGNOR TO SOCIETE ALSACIENNE DE CONSTRUCTIONS MECANIQUES, OF MULHOUSE, FRANCE, AND AKTIEBOLAGET ATMOS, OF STOCKHOLM, SWEDEN

MEANS FOR REMOVING SCALE DEPOSITS IN STEAM BOILERS, FEED WATER HEATERS, AND THE LIKE

Application filed December 21, 1929, Serial No. 415,765, and in France March 19, 1929.

The invention relates to an improved method, and means for removing scale deposits in steam boilers, feed water heaters and like receptacles wherein a liquid is heated and is liable to produce scale deposits.

As is well known, in steam boilers of the known types, whatever be the pressure at which they operate, scale deposits are formed at different points, from the substances which are dissolved or in suspension in the feed water; such deposits are chiefly formed upon the internal face of the vaporizing surfaces, and more particularly upon the parts which are the most strongly heated. Such scale deposits impair the heat conducting capacity of the walls, thus reducing the rate of steaming and raising the temperature of said walls, which are liable to be heated to redness, to be deformed, to crack and burst.

In the boiler plants of large size, such drawbacks are obviated by the exclusive use of distilled water, but this is attended with great complications, and is in fact not altogether satisfactory, as impure water may be accidentally mixed with the distilled water, thus occasioning deposits of scale.

Hence, it is necessary to inspect and examine these parts, and to proceed, at stated intervals, with a cleaning of the vaporizing surfaces, whether the boilers are supplied with raw or filtered water or even with distilled water. During the cleaning by the methods in current use, the boiler plant must be brought to rest with a subsequent loss of time.

The present invention has for its object to obviate the aforesaid drawbacks, that is the deposits of scale which are liable to cause bursting of the boiler, and which, at all events, require the cleaning; the invention is more particularly concerned with boilers having rotary vaporizing tubes.

According to an important feature of the invention, the boiler is provided with chains or other scraping means, which are kept in constant motion, and whose friction upon the internal surface of the vaporizing walls will prevent the formation of scale deposits. The solid particles which tend to deposit are continually stirred up by the mass of the water in motion. The water charged with solid substances is drawn off in a continuous or intermittent manner, in such amount that the concentration of solid substances in the boiler water will not exceed a given value, compatible with the proper operation of the boiler.

The accompanying drawing shows, diagrammatically and by way of example, an embodiment of the invention in the case of a rotary boiler.

In this drawing, 1 is a boiler water tube which is rotatably mounted in the combustion chamber. The speed of rotation is kept sufficiently slow to allow the water contained therein to form a practically horizontal sheet. A chain 2, attached to suitable brackets 3 and 4 at points substantially on the longitudinal axis of the boiler tube, as shown, drags upon the bottom of the tube, from which it continually removes the deposits.

In this manner, any scale deposit will be prevented. The solid substances remain in suspension in the water. The chain also removes from the wall the bubbles of steam which may be formed, thus furthering the heat conduction.

The impure water may be drawn off at will through a draining pipe 5.

Obviously, the invention is not limited to the constructional form above specified, which is given solely for the purpose of illustration; it is not restricted to a particular type of rotary boiler, nor to the provision of a chain which may be replaced by equivalent scraping means, nor to the attaching means therefor, nor to the draining arrangement, etc. It is further applicable to rotary feed water heaters and like devices.

Having now described my invention what I claim as new and desire to secure by Letters Patent is:

1. The combination with a rotating boiler tube of a chain arranged longitudinally within the tube and adapted to drag on the inner surface of the latter, and means for supporting the opposite ends of said chain in stationary positions with respect to said tube.

2. The combination with a rotating boiler tube of a chain arranged longitudinally within the tube and adapted to drag on the inner surface of the latter and means for supporting the opposite ends of said chain in stationary positions with respect to said tube at points substantially on the longitudinal axis of the boiler tube.

3. The combination with a rotating boiler tube of a chain arranged longitudinally within the tube and adapted to drag on the inner surface of the latter and means stationary with respect to the tube and rotating with it for supporting the opposite ends of said chain at points substantially on the longitudinal axis of said tube.

In testimony whereof I have signed my name to this specification.

MARCEL EHLINGER.